(12) United States Patent
Dalisdas et al.

(10) Patent No.: US 9,921,236 B2
(45) Date of Patent: Mar. 20, 2018

(54) SENSOR DEVICE FOR SPEED MEASUREMENT ON A WHEEL OF A VEHICLE

(71) Applicant: WABCO GmbH, Hannover (DE)

(72) Inventors: Jurgen Dalisdas, Hannover (DE); Oliver Grundker, Wedemark (DE); Sebastian Koss, Hannover (DE)

(73) Assignee: WABCO GmbH, Hannover (DE)

( * ) Notice: Subject to any disclaimer, the term of this patent is extended or adjusted under 35 U.S.C. 154(b) by 78 days.

(21) Appl. No.: 14/652,505

(22) PCT Filed: Nov. 22, 2013

(86) PCT No.: PCT/EP2013/003526
§ 371 (c)(1),
(2) Date: Jun. 16, 2015

(87) PCT Pub. No.: WO2014/108149
PCT Pub. Date: Jul. 17, 2014

(65) Prior Publication Data
US 2015/0331005 A1 Nov. 19, 2015

(30) Foreign Application Priority Data

Jan. 8, 2013 (DE) .......................... 10 2013 000 204

(51) Int. Cl.
*G01P 3/488* (2006.01)
*G01P 3/481* (2006.01)
(Continued)

(52) U.S. Cl.
CPC .............. *G01P 3/481* (2013.01); *B60T 8/171* (2013.01); *G01D 5/145* (2013.01); *G01P 1/00* (2013.01);
(Continued)

(58) Field of Classification Search
CPC ...... G01D 11/245; G01D 5/145; G01D 11/30; G01P 3/481; G01P 3/488; G01P 1/00; G01P 1/026; B60T 8/171
See application file for complete search history.

(56) References Cited

U.S. PATENT DOCUMENTS 3,934,685 A * 1/1976 Jovick .................... G01P 3/488
188/181 R
3,944,864 A * 3/1976 Jovick .................... G01P 3/488
188/181 R
(Continued)

FOREIGN PATENT DOCUMENTS

DE 25 39 141 3/1977
DE 25 48 773 5/1977
(Continued)

OTHER PUBLICATIONS

English Translation of DE 10 2004 062087 A1 using Google Translate (utilized for citing to the German document within the OA).*

*Primary Examiner* — John Olszewski
*Assistant Examiner* — Thomas E Worden
(74) *Attorney, Agent, or Firm* — Warner Norcross & Judd LLP

(57) ABSTRACT

A sensor device for speed measurement on a wheel of a vehicle includes a sensor carrier with an integrated sensor to sense the rotation of a pole wheel that rotates along with the wheel. The sensor device has a clamping mechanism integrated into the sensor carrier by which the sensor carrier can be displaceably clamped into a holding opening in the region of the wheel and/or in any orientation with respect to rotations about the longitudinal axis of the sensor carrier. The sensor arrangement can be mounted with less effort and more cost-efficiently than with the current international standard of combining a clamping bush and subsequently (Continued)

mounted rod sensor. Spring-loaded clamps can be fastened as terminal blocks in longitudinal grooves in the sensor, and the spring-loaded elements thereof can protrude over the circumference of the sensor prior to mounting.

9 Claims, 1 Drawing Sheet

(51) Int. Cl.
    *B60T 8/171*     (2006.01)
    *G01D 5/14*     (2006.01)
    *G01P 1/00*     (2006.01)
    *G01P 1/02*     (2006.01)
    *G01D 11/24*     (2006.01)
    *G01D 11/30*     (2006.01)

(52) U.S. Cl.
    CPC .............. *G01P 1/026* (2013.01); *G01P 3/488* (2013.01); *G01D 11/245* (2013.01); *G01D 11/30* (2013.01)

(56) References Cited

U.S. PATENT DOCUMENTS

| | | | | |
|---|---|---|---|---|
| 4,013,954 A * | 3/1977 | Deem | ................... | G01P 3/488 188/181 R |
| 4,110,647 A * | 8/1978 | Eslinger | ................. | G01P 3/488 188/181 R |
| 4,960,333 A * | 10/1990 | Faye | ................... | B60B 27/0005 324/173 |
| 5,281,911 A * | 1/1994 | Caron | ................... | G01P 3/488 188/181 R |
| 5,291,130 A * | 3/1994 | Kendzior | ................ | B60B 7/002 188/181 R |
| 5,296,805 A * | 3/1994 | Clark | ...................... | B60T 8/171 188/181 R |
| 5,642,042 A * | 6/1997 | Goossens | ................. | G01P 1/00 324/173 |
| 5,920,193 A * | 7/1999 | Tola | .......... | G01P 1/00 324/173 |
| 7,137,740 B2 * | 11/2006 | Vignotto | ................. | B60B 27/00 384/448 |
| 7,225,692 B2 * | 6/2007 | Ulrici | ................... | G01D 11/245 384/448 |
| 9,030,191 B2 * | 5/2015 | Ninomiya | ............. | F16C 33/723 324/160 |
| 2002/0125881 A1 * | 9/2002 | Stroeters | ................. | G01P 3/443 324/173 |
| 2008/0303513 A1 * | 12/2008 | Turner | .................... | G01P 3/488 324/160 |
| 2009/0251133 A1 * | 10/2009 | Fukada | ................... | G01P 1/026 324/174 |
| 2009/0274404 A1 * | 11/2009 | Torii | ....................... | F16C 33/78 384/448 |
| 2009/0285515 A1 * | 11/2009 | Kawamura | ........... | F16C 41/007 384/448 |
| 2010/0061671 A1 * | 3/2010 | Norimatsu | .......... | B60B 27/0005 384/448 |
| 2010/0092117 A1 * | 4/2010 | Ono | ........................ | B60B 27/00 384/448 |
| 2010/0124389 A1 * | 5/2010 | Norimatsu | .......... | B60B 27/0005 384/448 |
| 2012/0112742 A1 * | 5/2012 | Schrader | .............. | G01D 11/245 324/252 |
| 2014/0167741 A1 * | 6/2014 | Pan | ....................... | F16H 57/029 324/160 |

FOREIGN PATENT DOCUMENTS

| | | | | |
|---|---|---|---|---|
| DE | 22 43 331 C2 | 2/1984 | | |
| DE | 32 29 207 A1 | 4/1984 | | |
| DE | 39 19 109 A1 | 12/1990 | | |
| DE | 101 16 509 A1 | 10/2001 | | |
| DE | 10 2004 062 087 A1 | 4/2006 | | |
| DE | 102004062087 A1 * | 4/2006 | .......... | G01D 11/245 |
| DE | 10 2008 001 133 A1 | 10/2009 | | |

\* cited by examiner

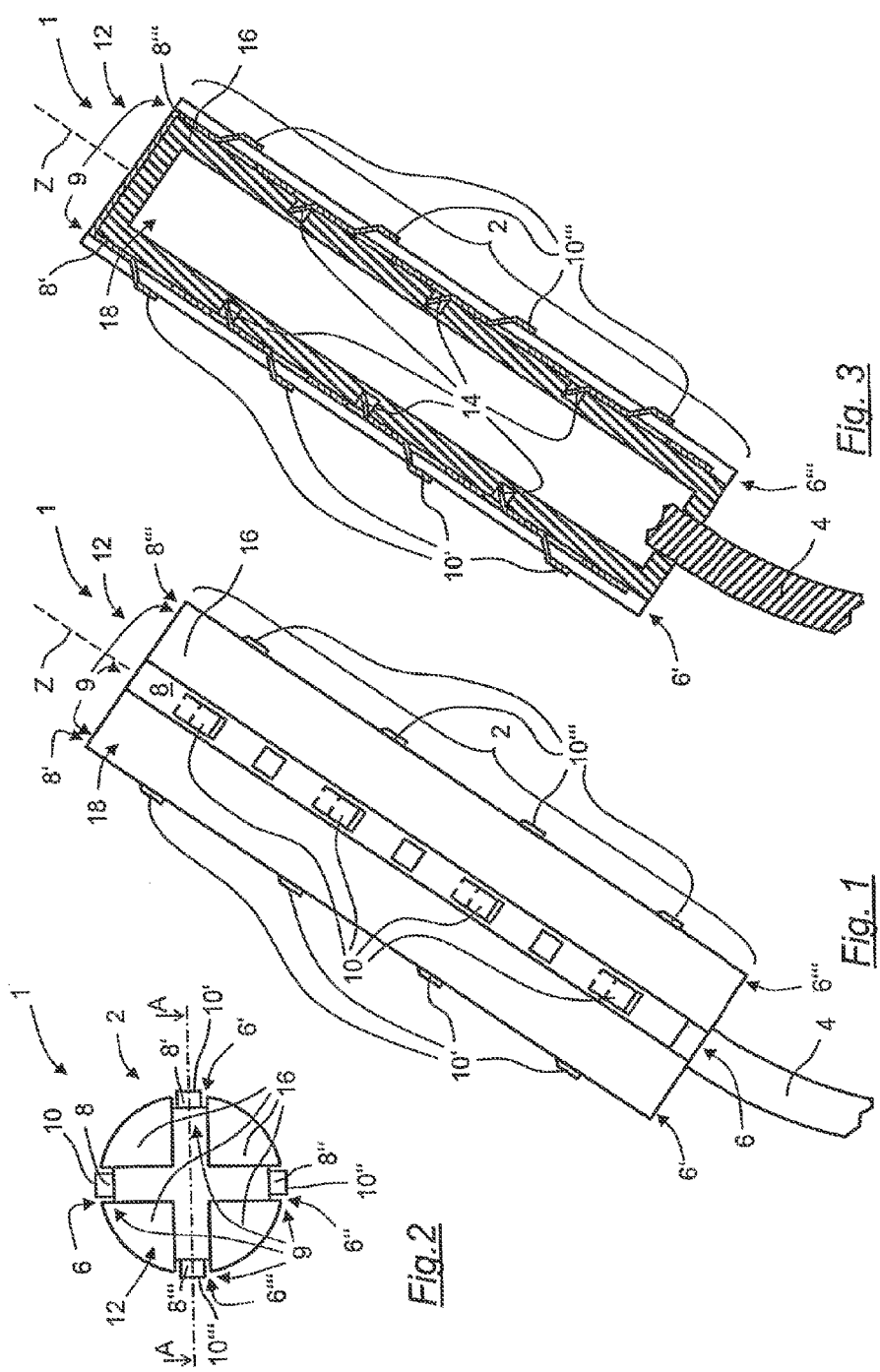

SENSOR DEVICE FOR SPEED MEASUREMENT ON A WHEEL OF A VEHICLE

FIELD OF THE INVENTION

The invention generally relates to a sensor device for speed measurement on a wheel of a vehicle, such as, for example, a commercial vehicle.

BACKGROUND OF THE INVENTION

A known sensor device of the general type under consideration is a rod sensor with a rod on the sensor head where a passive sensor is arranged for passively sensing the rotation of an exciter wheel. This known rod sensor is configured such that the rod can be clamped by means of a separate clamping bush in a holding opening, for example a hole or a bore, arranged in the region of the wheel in any orientation with respect to rotations about its rod axis. For this purpose, the clamping bush is initially inserted in the holding opening. The rod is then inserted into the clamping bush until contact is made with the exciter wheel arranged on the wheel and co-rotating with the wheel, and the rod is clamped in the holding opening by means of the clamping bush. However, the rod remains displaceable in this case if a sufficiently large force is used, particularly axially in the holding opening. Due to axle bearing play, particularly when a vehicle is cornering, which is exhibited by the rod sensor and the exciter wheel as part of a brake system, the exciter wheel can therefore push the rod sensor axially back into the holding opening, and the rod is simultaneously held in the holding opening by means of the clamping bush. This kind of fastening counteracts possible damage to the rod sensor.

A disadvantage of clamping the rod of the known rod sensor in the holding opening by means of the known clamping bush is the work involved and the manufacturing and assembly costs.

SUMMARY OF THE INVENTION

Generally speaking, it is an object of the present invention to reduce the work and cost involved in speed measurement on a wheel of a vehicle.

According to an embodiment of the present invention, a sensor device for speed measurement on a wheel of a vehicle, such as a commercial vehicle, has a sensor carrier with a sensor integrated in the sensor carrier, in order to sense, in particular to scan, the rotation of an exciter wheel co-rotating with the wheel. The invention has application with respect to a rod sensor, where the sensor is integrated in a rod.

In an embodiment, the sensor device includes a clamping mechanism integrated in the sensor carrier. In particular, the damping mechanism is fixed to a housing or to a sleeve of the sensor carrier, wherein the sensor integrated in the sensor carrier is preferably arranged entirely surrounded by the housing or completely within the housing. The housing is preferably a body formed by a hardened encapsulation of the sensor using a plastic, for example. The clamping mechanism is preferably only partially arranged on the housing or else it does not enclose the housing completely. The sensor device is, or the clamping mechanism is, configured such that the sensor carrier is displaceably, particularly axially displaceably, clampable by way of the clamping mechanism for the purpose of speed measurement in the holding opening referred to above in the region of the wheel and/or clampable in any orientation in respect of rotations about the longitudinal axis, in particular the rod axis, of the sensor carrier or in any orientation rotatable about the longitudinal axis, particularly the rod axis.

The sensor carrier is preferably only axially displaceably clampable in the case of an axially displaceable design. This guarantees a secure hold in the radial direction. The sensor carrier is preferably additionally clampable, such that the sensor carrier can only be displaced by overcoming an axially acting static frictional force between the sensor carrier, in particular the clamping mechanism, and the holding opening. The holding opening is a bore, a hole or a special holding device, for example.

At least insofar as the sensor carrier is configured in a clampable manner in any orientation in respect of rotations about the longitudinal axis of the sensor carrier, the sensor carrier preferably has no means that would force a predefined orientation of the sensor carrier in the holding opening. Consequently, the sensor carrier can be assembled without any great effort, in particular without adjustment work.

It will he appreciated that embodiments according to the present dispense with the separate clamping bush referred to above. The sensor carrier or rod can be inserted straight into the holding opening by means of the integrated clamping mechanism and is automatically clamped there. The inventive sensor device, which preferably also has a connection cable in addition to the sensor carrier, can be produced cost-effectively and assembled simply and cost-effectively. In existing systems, the conventional combination of rod sensor and clamping bush can be replaced easily and cost-effectively with the inventive sensor device.

According to an embodiment, the sensor carrier is configured such that it can be clamped in a conventional holding opening that is suitable for receiving a conventional clamping bush that encloses a round rod-shaped sensor substantially cylindrically. A cylindrical or round rod-shaped object can therefore be clamped in the holding opening. The sensor carrier to be clamped in the holding opening is therefore preferably, but not necessarily, likewise configured in a round rod shape. In particular, the sensor carrier is preferably substantially round rod-shaped when observed without the clamping mechanism. Along with the permanently integrated clamping mechanism, the sensor carrier is preferably at least approximately configured in a round rod shape.

According to an alternative embodiment, the sensor carrier can have any other shape that is suitable for clamping or mounting the sensor carrier in an axially displaceable manner in the holding opening. For example, the sensor carrier can be oval or square in configuration or configured with an oval or square cross section perpendicularly to its longitudinal axis. The sensor carrier can have a substantially triangular cross section perpendicularly to its longitudinal axis, but with rounded corners. With these embodiments, no changes to the conventional holding opening preferably need to be provided for. In particular, the sensor carrier of the inventive sensor device may be inserted in each conventional holding opening, which is also suitable for receiving the conventional clamping bush.

According to an embodiment, parts of the clamping mechanism project, at least in the event that the sensor carrier is not clamped, partially radially beyond the housing of the sensor carrier. The sensor carrier with the clamping mechanism should not be regarded as substantially round rod-shaped in this case, but, at best, as only approximately round rod-shaped. Or, it can take another form, for example, it can be a square, it can be substantially triangular, or it can have an oval cross section. Because of this configuration of the clamping mechanism, the clamping mechanism may provide a sufficiently great radially acting pretension and therefore a sufficiently great axially acting static frictional force.

In the event that the sensor carrier is clamped in the holding opening, the clamping mechanism is preferably predominantly arranged within the circumference of the sensor carrier when viewed without: the clamping mechanism or within a virtual envelope of the housing. This preferably applies with a substantially round rod-shaped configuration of the sensor carrier when viewed without the clamping mechanism. The sensor carrier with the integrated clamping mechanism is also clamped in this case in a substantially round rod-shaped manner and can therefore advantageously be clamped in a corresponding, cylindrical, holding opening.

However, even with anything other than a substantially round rod-shaped configuration of the sensor carrier, namely, for example, in the case of a configuration with an oval or square, or substantially triangular, cross section, it is advantageous for the sensor carrier to be configured such that it is held in the holding opening in a substantially centered manner even without the clamping mechanism, so that a sufficiently secure fit of the sensor carrier in the holding opening is promoted using the clamping mechanism.

According to an embodiment, the clamping mechanism provides at least one clamping strip, which extend(s) in an axial direction or parallel to the longitudinal axis or rod axis laterally relative to the sensor carrier. Alternatively, the clamping strip presents a different shape, for example a spiral shape, or is placed in a substantially circular fashion about the circumference of the housing or sleeve of the sensor carrier. In particular, there is no need to provide a cylindrical clamping mechanism, as is known from the clamping bush. Instead, the sensor carrier is mounted straight in the holding opening. It is sufficient for the sensor carrier to be clamped by means of a clamping strip in the holding opening.

The clamping strip preferably has a plurality of spring elements for this purpose, in order to bring about a defined friction connection between the sensor carrier and the holding opening in an axial direction of the sensor carrier or in order to provide an adequate static frictional force. The clamping strip is preferably metallic or contains metal. Alternatively, the clamping strip is another material, for example plastic. Because of the spring elements, it is possible to clamp the sensor carrier in the holding opening such that it is secured to prevent accidental shifting. At the same time, the spring elements ensure that the exciter wheel can push the sensor carrier back axially in the holding opening during cornering, for example, so that the sensor carrier is not damaged or its function impaired and it is subsequently at a sufficient distance from the exciter wheel once again.

According to an embodiment, the clamping mechanism or the housing additionally provides at least one contact strip, which provides a contact surface or at least two contact points or bearing points for the holding opening when the sensor carrier is clamped in the holding opening. In contrast to the clamping strip, the contact strip has no spring elements. Otherwise, however, the contact strip is preferably identically or similarly configured to the clamping strip and integrated in the sensor carrier.

According to an embodiment, the sensor carrier has, in a first variant, at least three strips from a group comprising the clamping strips and the contact strips, wherein these strips are arranged parallel to the longitudinal axis of the sensor carrier and preferably equidistantly to one another. In particular, the clamping mechanism has at least one clamping strip and at least two contact strips. Alternatively, the clamping mechanism according to the first variant of this embodiment has at least two clamping strips and at least one contact strip. Centering in the holding opening can therefore be achieved with minimal material expenditure.

According to an alternative variant of this embodiment, the sensor carrier has at least four strips oriented in an axial direction and preferably arranged equidistantly to one another, at least two strips of which are preferably configured as clamping strips. When four strips are used, the material expenditure is slightly higher compared with three strips, but this enables an increased right-angled arrangement of components, particularly also relative to the strips. This leads to production advantages and, therefore, reduced costs. Alternatively, the clamping mechanism has only one clamping strip and/or only one contact strip or two or more than four or an arbitrary number of clamping strips and/or contact strips and/or other means of clamping.

According to an embodiment, the clamping strips are configured such that the spring elements, when establishing the frictional connection following an axial displacement of the sensor carrier in the holding opening, automatically counteract this axial displacement or even supplement this axial displacement with an additional contribution. The spring elements ensure that once the sensor carrier has been displaced from the exciter wheel in the holding opening it does not swing back again but is held at the position it has reached or, when the spring elements interlock with the holding opening or when the frictional connection is established by means of these spring elements, is pushed away even slightly further from the exciter wheel, so that the probability of contact with the exciter wheel is subsequently diminished. Contact with the exciter wheel and therefore grinding of the sensor head on the exciter wheel is thereby minimized overall.

According to an embodiment, the sensor carrier is configured such that abrasive behavior on the sensor carrier by the exciter wheel is counteracted. Alternatively or in addition, this may take place through a suitable choice of material, wherein the sensor head is configured in metal, for example, or has metallic parts, which display a lower abrasive action compared with the sleeve of the sensor carrier, which is otherwise preferably predominantly made of plastic.

The clamping strips on the sensor head of the sensor carrier preferably continue in head portions or bend radially in the direction of the longitudinal axis of the sensor carrier, so that these head portions counteract abrasive behavior by the exciter wheel on the sensor carrier. The clamping mechanism or the clamping strips, including any connecting portions or head portions that may be present on the sensor head, are preferably formed of metal. Alternatively, the clamping mechanism or clamping strips are made of plastic or another material that is reversibly deformable or of another material mixture or combination of materials that is at least partially reversibly deformable for the clamping function.

According to an embodiment, the sensor device has an active sensor arranged on the sensor head of the sensor carrier for active detection of the rotation of the exciter wheel. Unlike a passive sensor, the active sensor cannot generate a signal without an auxiliary voltage, but requires a supply voltage or an auxiliary voltage. The active sensor preferably has passive pickups and primary electronics in this case. The primary electronics require the auxiliary voltage in order to evaluate the electrical properties of the passive pickups that can be changed depending on the position of the exciter wheel. The active sensor is advantageously a Hall sensor or Hall effect sensor or a differential Hall effect sensor for sensing, in particular for scanning, the rotation of the exciter wheel using the Hall effect. The Hall effect sensor allows contact-free measurement via a measurable potential gradient, which is set depending on the position of the exciter wheel relative to the active sensor, in particular depending on whether a tooth of the exciter wheel or a gap located between two teeth is positioned in front of the active sensor.

According to an embodiment, the active sensor is a magnetic field sensor, in particular a GMR (giant magnetoresistance) sensor. The GMR sensor uses the GMR effect, which is a quantum mechanical effect. In this case, variations in the magnetic field caused by changes in position or the rotation of the exciter wheel produce measurable changes in the electrical resistance of a structure provided for this purpose in the active sensor.

The active sensor and therefore the sensor carrier as a whole is preferably positionally independently clampable in the holding opening in relation to rotations about the longitudinal axis of the sensor carrier, such that the sensor device can be mounted without adjustment work and put into operation without calibrating actions. In particular, the active sensor is configured such that the active sensor automatically recognizes its orientation in respect of rotations about the longitudinal axis of the sensor carrier or its orientation relative to the exciter wheel from measurements taken. The active sensor is therefore preferably a positionally independent sensor that requires no assembly in a predetermined orientation.

According to an embodiment, the sensor device has on the sensor head of the sensor carrier a passive sensor for the passive detection of the exciter wheel rotation. The electrical function in this case resembles the function of the known passive rod sensor, which can be clamped in the holding opening by means of a clamping bush. Therefore, inventive embodiments also support brake systems that evaluate signals only from passive sensors.

An embodiment of a brake system according to the present invention has a plurality of sensor devices of which at least one sensor device is configured according to an embodiment of the present invention. Furthermore, the brake system has a plurality of brakes for braking and/or fixing wheels of the vehicle, In addition, the brake system preferably is an electronic brake system for controlling and/or regulating the brakes, taking account of signals or data from the sensor devices, the brake system being connected to the sensor devices by means of an electrical signal line or data line.

The brake system may have a mixed arrangement of sensor devices, wherein known sensor devices are used in part and sensor devices according to embodiments of the present invention are used in part. In the event of a defect in a known sensor device, the combination of clamping bush and the defective sensor device may be replaced by an inventive sensor device without a clamping bush.

A vehicle according to an embodiment of the present invention can be a commercial vehicle and can provide the inventive sensor device or the inventive brake system with the inventive sensor device. In addition, the vehicle preferably has a plurality of axles, in particular at least one front axle with at least one wheel and at least one rear axle with at least one wheel. The sensor carrier of a sensor device according to an embodiment of the present invention is arranged in the region of at least one of these wheels in a holding opening.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below on the basis of exemplary embodiments illustrated in the accompanying drawings, in which:

FIG. 1 shows a sensor device according to an exemplary embodiment of the present invention in simplified schematic form as a side view;

FIG. 2 shows the sensor device in the exemplary embodiment according to FIG. 1 in simplified schematic form as a plan view in the direction of the sensor head; and FIG. 3 shows the sensor device in the exemplary embodiment according to FIGS. 1 and 2 in simplified schematic form as a sectional side view.

DETAILED DESCRIPTION OF THE PREFERRED EMBODIMENTS

FIG. 1, FIG. 2 and FIG. 3 show a sensor device 1 according to an exemplary embodiment of the present invention. The sensor device 1 is configured as a rod sensor and is suitable and provided for speed measurement on a wheel of a vehicle. FIG. 1 shows a side view in this case, FIG. 2 shows a plan view and FIG. 3 shows a section on a sectional plane A characterized in FIG. 2, in which a longitudinal axis or rod axis Z runs.

The sensor device 1 has a sensor carrier 2 configured as a rod and a connection cable 4. The sensor carrier 2 is substantially of round rod form, but has four grooves 6, 6', 6" and 6'" parallel to the longitudinal axis or rod axis Z, in which clamping strips 8, 8', 8" and 8'" are arranged. The clamping strips 8, 8', 8" and 8'" are a clamping mechanism 9 or parts of a clamping mechanism 9, which provides spring elements 10, 10', 10" and 10'" to clamp the sensor device 1 or the sensor carrier 2 in a holding opening in the region of the wheel of the vehicle. The spring elements 10, 10', 10" and 10'" are integrally configured in the respective clamping strip 8, 8', 8" or 8'" as a metallic strip, from which parts are bent out as the spring elements 10, 10', 10" and 10'", such that they project beyond the circumference of the sensor carrier 2 being considered without the clamping mechanism 9. The spring elements 10' and 10'" at least are connected to one another according to this exemplary embodiment via the sensor head 12 of the sensor carrier 2, in particular integrally configured, as can be seen from FIGS. 2 and 3. The spring elements 10' and 10" may likewise be connected to one another and also, where necessary, to the spring elements 10' and 10'" on the sensor head 12.

As an alternative to the exemplary embodiment shown, connections of the clamping strips 8, 8', 8", 8'" via the sensor head 12 are dispensed with. The sensor carrier can provide fewer or more than four clamping strips, and also one or a plurality of contact strips or clamping mechanisms configured in some other manner and/or a guiding mechanism.

Further portions are provided according to this exemplary embodiment that form hooks 14 angled in the direction of the longitudinal axis or the rod axis Z and project into blind holes in a housing or a sleeve 16, in particular a plastic sleeve, of the sensor carrier 2, similar to portions of the clamping strips 8, 8', 8" and 8''', as spring elements. The clamping strips 8, 8', 8" and 8''' are therefore fixedly connected to the sleeve 16 of the sensor carrier 2.

According to alternative exemplary embodiments, the further portions of the clamping strips 8, 8', 8" and 8''' provided for fastening to the housing have no hooks, but are of any other form that is suitable for fixing the clamping strips 8, 8', 8" and 8''' on the housing or sleeve 16 of the sensor carrier 2 and therefore integrating the clamping mechanism 9 in the sensor carrier 2. In the exemplary embodiment shown, the blind holes display straight portions, but according to alternative exemplary embodiments they can have different kinds of portions, for example concave or convex portions, in particular to form protections for clamping or locking the hooks 14 or corresponding further portions of the clamping strips 8, 8', 8" and 8'''.

Alternatively, the hooks 14 and/or the blind holes are dispensed with in the sleeve 16. Instead of the blind holes, projections are provided, for example, which fill holes in the clamping strips 8, 8', 8" and 8''' and therefore fix the clamping strips to the sleeve 16. Alternatively or in addition, the clamping strips 8, 8', 8" and 8''' are adhered or screwed to the sleeve 16 or can be produced by special contours, by means of which, for example, a form fit or anchoring or wedging with the sleeve 16 can be produced, or fixedly secured in some other way to the sleeve 16 and therefore integrated in the sensor carrier 2.

A sensor 18 is arranged on the sensor head 12 of the sensor carrier 2, with which the rotation or respective position of an exciter wheel can be recorded or measured. This sensor 18 is provided in an embodiment as an active sensor, by means of which the rotation or respective position of an exciter wheel can be sensed, in particular scanned, actively, i.e., using an auxiliary voltage or supply voltage, when the sensor carrier 2 is clamped in a holding opening suitably positioned in front of the exciter wheel. Alternatively, a passive sensor is provided. The active sensor 18 is able, due to its particular configuration, to determine its orientation relative to the rotational movement of the exciter wheel automatically. Consequently, the sensor carrier 2 can be installed with the active sensor 18 in a positionally independent manner relative to rotations about the longitudinal axis or rod axis Z and therefore without complex adjustment and without subsequent manual calibration.

Due to the particular embodiment of the sensor device 1, in particular the clamping strips 8, 8', 8" and 8''', abrasive behavior of the sensor device 1 due to grinding on the exciter wheel is prevented or at least reduced compared with known sensor devices, which are clamped by means of a clamping bush.

In light of all the foregoing, the inventive embodiments provide a sensor device for speed measurement on a wheel of a vehicle that can be produced cost-effectively, clamped in a holding opening with a small amount of work and therefore mounted cost-effectively and without a great deal of work.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A sensor device for speed measurement on a wheel of a vehicle, the sensor device comprising:
   a sensor carrier extending longitudinally to define an axial direction, the sensor carrier including an outer surface that defines a plurality of longitudinal grooves recessed therein and extending in the axial direction;
   a sensor integrated in the sensor carrier to sense the rotation of an exciter wheel co-rotating with the wheel; and
   a clamping mechanism integrated in the sensor carrier, the clamping mechanism including a plurality of clamping strips each having an elongated member extending in the axial direction of the sensor carrier within a respective one of the plurality of longitudinal grooves, each of the plurality of clamping strips further including a spring element extending outwardly from the elongated member of the clamping strip in a radial direction, beyond the outer surface of the sensor carrier such that each spring element protrudes from a respective one of the plurality of grooves to engage an inner surface of a holding opening opposite of the sensor carrier outer surface in a region of the wheel, by which the sensor carrier is (i) axially displaceably clampable in the holding opening in a region of the wheel and (ii) clampable in any orientation in respect to rotations about a longitudinal axis of the sensor carrier.

2. The sensor device as claimed in claim 1, wherein the spring element for each of the plurality of clamping strips is integrally joined to the elongated member of one of the plurality of clamping strips.

3. The sensor device as claimed in claim 2, wherein each of the plurality of clamping strips includes a hook that projects radially inwardly into a hole in one of the plurality of longitudinal grooves such that the plurality of clamping strips automatically counteract a reversal of an axial displacement of the sensor carrier in the holding opening.

4. The sensor device as claimed in claim 1, wherein the sensor is an active sensor arranged on a sensor head of the sensor carrier for active detection of rotation of the exciter wheel.

5. The sensor device as claimed in claim 1, wherein the sensor is a passive sensor arranged on a sensor head of the sensor carrier for passively recording rotation of the exciter wheel.

6. A vehicle brake system, comprising:
   a plurality of brakes for at least one of braking and locking wheels of the vehicle;
   a plurality of sensor devices for speed measurement on the wheels, at least one of the sensor devices being the sensor device as claimed in claim 1; and
   a controller configured to at least one of control and regulate the brakes based at least in part on signals from the sensor devices, the controller being connected to the sensor devices by one of an electrical signal line and a data line.

7. A vehicle, comprising the sensor device as claimed in claim 1.

8. The sensor device according to claim 1, wherein the sensor carrier is a rod.

9. A vehicle, comprising:
a brake system, the brake system including a plurality of brakes for at least one of braking and locking wheels of the vehicle,
a plurality of sensor devices for speed measurement on the wheels, at least one of the sensor devices being the sensor device as claimed in claim 1, and
a controller configured to at least one of control and regulate the brakes based at least in part on signals from the sensor devices, the controller being connected to the sensor devices by one of an electrical signal line and a data line.

\* \* \* \* \*